July 8, 1969 — J. R. BUCK — 3,453,979
FLUIDIC CONTROL SYSTEM
Filed Nov. 24, 1967
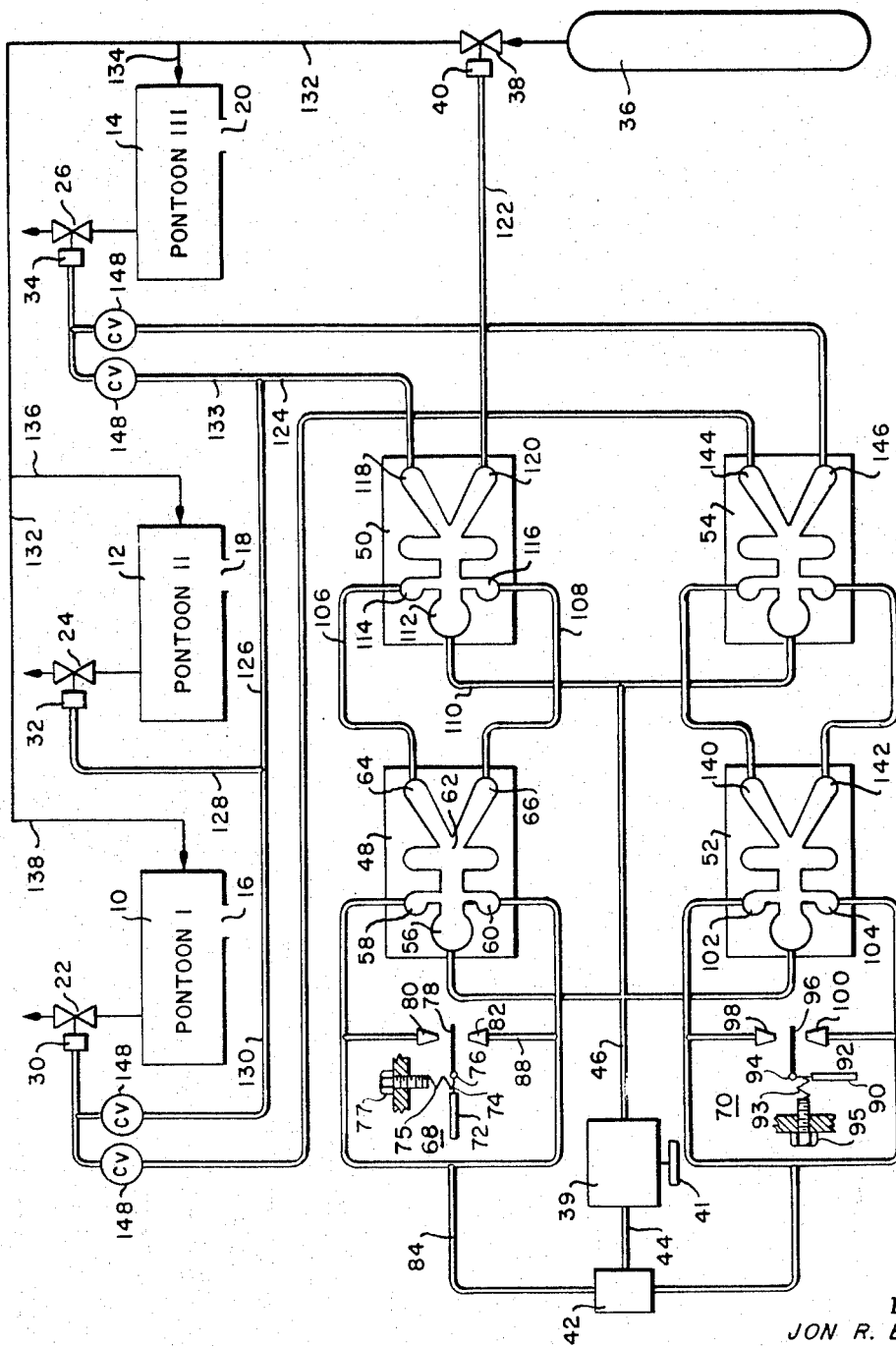
INVENTOR
JON R. BUCK
BY *O. Hodges*
ATTORNEY United States Patent Office 3,453,979
Patented July 8, 1969

3,453,979
FLUIDIC CONTROL SYSTEM
Jon R. Buck, P.O. Box 463, Uncasville, Conn. 06382
Filed Nov. 24, 1967, Ser. No. 685,397
Int. Cl. B63c 7/04
U.S. Cl. 114—52                    13 Claims

ABSTRACT OF THE DISCLOSURE

A control system for controlling the velocity and attitude of a buoyant pontoon system. This system provides a velocity sensor and an attitude sensor, the output of these sensors providing control signals for fluid amplifiers. The output of the amplifiers is used to control the differential buoyancy of the pontoons for attitude control and the total buoyancy of the system for velocity control. Buoyancy of the pontoon is adjusted by supplying compressed air to increase buoyancy and venting air from the pontoons for decreasing buoyancy.

The invention described herein may be manufactured and used by or for the Government of the United States of America for governmental purposes without the payment of any royalties thereon or therefor.

BACKGROUND OF THE INVENTION

This invention relates to buoyant pontoon systems and in particular to a self-contained system for controlling vertical velocity and attitude of the system.

Systems such as the one described herein are frequently used in salvage work for raising sunken objects from the bottom of the sea. Prior art systems for deep sea salvage have used buoyant pontoons as lifting objects however their use has been restricted to providing the "breakout" force necessary to loosen the object from the sea floor. The force necessary for "breakout" is considerably higher than that needed to merely lift the vessel after breakout therefore, to avoid excessive velocity of ascent the breakout pontoons were disconnected after breakout was achieved. The object to be salvaged was then raised to the surface by means of cables attached to winches on surface ships. In some systems the buoyancy of the pontoons was made adjustable so as to allow control of vertical velocity. However these systems have required observation of attitude and velocity either by a diver who accompanied the system or by remote television cameras and corrections made by controls in the surface ship. The need for observation thus limited the depth at which the system could be operated either because of depth limitations of the diver or by poor visibility at greater depths preventing the use of television cameras. In addition these systems required connections for air or electricity from the surface ship to provide a means for adjusting pontoon buoyancy.

The present ssytem overcomes these disadvantages by providing totally self-contained system having velocity and attitude sensors for determining attitude and velocity of the pontoons. A fluidic control system, using sea water as the fluid medium, is utilized to supply air to the pontoons from a compressed air source to increase system buoyancy and to vent air from the pontoons to decrease buoyancy in response to the outputs of the sensors.

SUMMARY OF THE INVENTION

The invention described herein controls the vertical velocity and attitude of a buoyant body lifting system by means of an all fluidic system utilizing seawater as the fluid medium. There is provided a force balance velocity sensor in which the sensor deflects from a preset position in proportion to the velocity of flow across its sensing surface. The sensor is provided with biasing means for presetting the neutral position according to the desired velocity of ascent. Deflection of the sail from its preset position controls the input of the control fluid to a proportional fluid amplifier. When the sensed velocity exceeds the desired velocity, the output of the amplifier causes air to be vented from the pontoons to reduce the total buoyancy of the system. If the velocity is less than the predetermined velocity the output of the amplifier causes additional air to be supplied on the pontoons from a self-contained air source to increase the total buoyancy of the system. The attitude of the system about a horizontal axis is sensed by a pendulum or similar gravity sensing means. As in the velocity system described above, deviation of the sensor from the neutral position causes an imbalance at the control ports of the fluid amplifier. The output of the amplifier acts to control the differential buoyancy of the pontoons by adding or venting air as required to re-establish this sensor in the neutral position.

Thus there is provided in this invention a totally self-contained system for lifting an object according to a predetermined velocity and attitude program without the use of external monitors, external systems inputs or lifting devices. It is therefore an object of this invention to provide a totally self-contained fluidic control system for buoyant bodies.

Another object of this invention is to provide a fluidic control system for buoyant bodies for maintaining the vertical velocity and attitude of the system at predetermined levels.

A further object of the invention is to provide a fluid control system for buoyant body systems which is totally self-contained and utilizes as a control fluid the ambient fluid in which the system operates.

Other objects and many of the attendant advantages of this invention will be readily appreciated as the same becomes better understood by reference to the following detailed description when considered in connection with the accompanying drawings.

BRIEF DESCRIPTION OF THE DRAWINGS

The figure illustrates a schematic diagram of the system.

DESCRIPTION OF THE PREFERRED EMBODIMENT

Referring now to the drawing, there is shown a schematic diagram of the system as it may be applied in a buoyant pontoon system for lifting sunken objects. There are shown three buoyant pontoons 10, 12 and 14 of essentially identical construction each having an opening to the atmosphere as shown at 16, 18 and 20 and pressure actuated venting valves 22, 24, and 26 and their associated actuators 30, 32, and 34. A self-contained compressed air supply as shown at 36 is provided with a similar valve 38 and actuator 40 for supplying air to the pontoons.

Turning now to the fluidic control system there is shown at 39 a pump for supplying seawater under pressure for use as the control system fluid medium. Seawater is taken into the system through filter 41 and distributed to the control fluid system through regulator 42 by means of conduit 44 and to the power fluid system through conduit 46. The regulator 42 provides seawater at a low pressure to the sensors while the power fluid is supplied at a considerably higher pressure to the fluid amplifiers. This system is controlled through the use of four fluid amplifiers 48, 50, 52 and 54. These amplifiers are essentially identical and only one will be described in detail.

The amplifier 48 is of a proportional type in which the output is directly proportional to the control input. There is shown in amplifier 48 a power fluid input port 56 which is connected to the power fluid supply. Control ports 58 and 60 receive fluid from the control fluid system as regulated by the sensors.

The operation of the amplifier is as followers: with the power fluid entering through port 56 and equal pressures exerted at control ports 58 and 60 the fluid flow through the amplifier is divided at point 62 and flows equally through output ports 64 and 66. If the pressures at control ports 58 and 60 are unbalanced by action of the sensor the pressure at the output ports will be varied in direct proportion. For example if the pressure at control port 58 is higher than that at control port 60, the power fluid from port 56 will be deflected and will increase the pressure at output port 66. If the pressure difference at the control ports is reversed and the pressure at port 60 is higher than that at 58 the pressure at output port 64 will be proportionately higher than that at 66. Amplifier 52 operates exactly in the same manner but receiving its control signal from sensor 70. The second amplifier in each leg of the system, designated as 50 and 54, operate in the identical manner except that their input is derived from the preceeding amplifier for the purpose of increasing the output signal level.

The sensors 68 and 70 are of similar construction and differ only in the means for sensing deviation from a predetermined condition. Sensor 68 is a vertical velocity sensor for determining the vertical velocity of the body to which the system is attached. Element 72 is a sensing surface which extends from the body into the stream of fluid in which the body is floated. The sensing surface is attached to lever 74 which is pivoted at 76 and has at the other end thereof a flapper valve actuator 78. A portion of the control fluid entering the system through conduit 84 is diverted through conduits 86 and 88 and impinges upon the flapper valve. When the sail is in its neutral position the flow from nozzles 80 and 82 will be equal and hence the pressure at the control fluid ports of amplifier 48 will be equal. Deflection of the sail toward either nozzle will cause an unbalance in the control fluid ports of the amplifier and vary the output proportionately.

Means are provided for biasing the sensor lever so that the flapper valve actuator is midway between nozzles 80 and 82 when the velocity is at the preset value. Any conventional variable biasing means may be used such as a spring as shown at 75 and screw means 77 for adjusting the spring force to enable the system to be preset to any desirable velocity. As can be seen there is established a force balance sensing system which will maintain the flapper valve at its neutral position when the force acting on the sensing surface is equal to the preset bias force. Sensor 70 is an attitude sensor for sensing the attitude of the object to be raised about a horizontal axis. The sensing surface 90 may be a sensing surface similar to that in sensor 68 but extending vertically into the ambient fluid stream or a gravity sensing device such as a pendulum. The sensing element is again attached to a lever, shown at 92, which is pivoted at 94 and operates a flapper valve 96 in the same manner as described above. Deviation of the attitude sensor from its predetermined position unbalances the flow through nozzles 98 and 100 thus causing an unbalance in the control ports 102 and 104 of amplifier 52 to change the output of said amplifier. Biasing means, similar to that described above in relation to the velocity sensor are provided so that the desired attitude may be preset in the manner described above.

OPERATION OF THE SYSTEM

Turning first to the velocity control leg of the system, with the velocity sail 72 in the neutral position the flow of control fluid to the amplifier 48 through ports 58 and 60 is balanced and hence the output at ports 64 and 66 will be equal. The flow from these ports through conduits 106 and 108 to the control ports 114 and 116 of amplifier 50 will be also be equal. Thus the power fluid entering amplifier 50 through conduit 110 into port 112 will be diverted equally and at equal pressures through output ports 118 and 120. The system is so designed that the pressure of the fluid flowing from output port 120 through conduit 122 is not sufficient to cause actuator 40 to operate the air supply valve 38 similarly the pressure of the fluid at output port 118 supplied to the venting valves 22, 24 and 26 through conduits 124, 126 and 130 is not sufficient to actuate these valves 22, 24 and 26.

When the object to be lifted is resting on the ocean floor and its vertical velocity zero or at any other time when the vertical velocity is less than the preset value, the sensing surface 72 will be above its neutral position as shown and hence the flow from nozzle 82 will be restricted and the flow from nozzle 80 will be increased thus the input ports 58 and 60 will become unbalanced. Since the pressure at port 60 will be higher than that at point 58 the pressure at output port 64 will be higher than that at 66. This imblance in turn causes an unbalance at the control ports of amplifier 50. With the pressure at port 114 higher than that at 116 the pressure at output port 120 will be increased to a pressure sufficient to operate actuator 40 and open valve 38. The opening of valve 38 allows pressurized air to escape from tank 36 into the manifold conduit 132 and into each pontoon through conduits 134, 136 and 138 thus increasing the total buoyancy of the system. Similarly if the velocity of the system exceeds the predetermined amount the sail 72 will be deflected downward thus partialy closing port 80. This results in an increased pressure at output port 118 of amplifier 50 which will increase the pressure in conduit 124 which is connected to the venting values by conduits 126, 128, 130 and 133. The pressure in these conduits is then sufficient to operate actuators 30, 32 and 34 and vent air from the pontoons through valves 22, 24, and 26 thus decreasing the total buoyancy of the system. Thus it may be seen that the velocity sensor and the control amplifiers operate to maintain the vertical velocity of the system at predetermined value by introducing additional air to the pontoons to increase buoyancy or by venting air from the pontons to decrease buoyancy in response to the signal from the velocity sensor.

The attitude control system, consisting of attitude sensor 70 and amplifiers 52 and 54, operates in a similar manner to regulate the buoyancy in pontoons 10 and 14 to maintain the predetermined attitude of the system about its horizontal axis. By analogy to the descritpion of the velocity control system as described above, if the attitude sensing surface 90 is deflected in a clockwise manner by tilt of the system from the predetermined attitude the control fluid pressure at input port 104 of amplifier 52 will be increaed and the presure at port 102 will be decreased. The increased presure at output port 140 will cause a similar increase at output port 146 of amplifier 54 which operates actuator 34 and valve 26 to vent air from pontoon 14 to decrease its buoyancy and lower the end of the system to which this pontoon is attached. Similarly an increased output at port 144 of amplifier 54 will vent air from pontoon 10 through actuator 30 and valve 22 to lower that portion of the system with an opposite input from the attitude sensor. Check valves 148 are provided in the conduits to prevent inner action between the attitude sensing system and the velocity sensing system.

Thus it can be seen that there is herein provided a simple self-contained mechanical control system having a minimum number of moving parts and utilizing seawater or the ambient atmosphere in which the system is opearted as the control medium for controlling the attitude and velocity of the system about predetermined parameters.

While the system has been described in its preferred embodiment as useable in deep sea salvage operations it will be obvious to those skilled in the art that such a system has utility in a variety of appliations. For example, this system is adaptable to any use which requires controlled ascent or descent of an object in a fluid medium. Scientific instruments can be sent to the bottom or rise to the surface at any predetermined velocity and attitude as well as allowing an object to be stabilized at any level with the addition of depth control to the system. Further, the system is not limited to seawater as the fluid medium. With appropriate selection of the flotation fluid the system could be utilized for controlling airborn objects supported by inflatable balloons and controlled in a similar manner.

Obviously, many modifications and variations of the present invention are possible in the light of the above teachings. It is, therefore, to be understood that within the scope of the appended claims the invention may be practiced otherwise than as specifically described.

What is claimed is:

1. Apparatus for controlling buoyancy of an object in a fluid medium comprising:
    means for buoyantly supporting said object in said fluid medium, said support means having a chamber therein and an opening connecting said chamber and said fluid medium;
    a source of flotation fluid, said flotation fluid having a density of less than that of said fluid medium;
    means for connecting said source of flotation fluid to said chamber in said support means;
    means for regulating flow of said flotation fluid to said support means;
    means for releasing said flotation fluid from said support means;
    means for sensing the deviation of the buoyancy of said object in said fluid medium about a predetermined buoyancy;
    fluidic control means responsive to said sensing means for selectively controlling said means for regulating flow of said flotation fluid to said support means and said means for releasing flotation fluid from said support means, and fluidic control means utilizing the fluid of said fluid medium as the control fluid.

2. Apparatus for controlling motion of an object in the fluid medium as defined in claim 1 wherein said fluidic control means comprises:
    at least one proportional fluid amplifier, said amplifier having a power fluid input port, first and second control fluid input ports and first and second output ports;
    a source of pressurized power fluid;
    a source of pressurized control fluid, said control fluid being at a lower operating pressure than said power fluid;
    means connecting said source of control fluid to said input ports;
    means connecting said source of power fluid to said power fluid input port;
    means connecting one of said output ports to said means for regulating flow of said flotation fluid to said support means; and
    means for connecting the other of said output ports to said means for releasing flotation fluid from said support means.

3. Apparatus for controlling motion of a body in a fluid medium comprising:
    means for buoyantly supporting said body in said fluid, said support means having first and second chambers placed at first and second ends of said body;
    means for sensing the vertical velocity of said body;
    means responsive to said vertical velocity sensing means for controlling the total buoyancy of said support means;
    means for sensing the attitude of said body about a horizontal axis;
    means responsive to said attitude sensing means for controlling the differential buoyancy of said first and second chambers of said support means.

4. Apparatus for controlling motion of a body in a fluid medium according to claim 3 wherein said means responsive to said vertical velocity sensing means and said means responsive to said attitude sensing means are fluid amplifier means.

5. Apparatus according to claim 4 wherein said means for buoyantly supporting said body comprises:
    a first buoyant chamber attached adjacent one end of said body and having an opening in the bottom surface thereof open to said fluid atmosphere;
    a second buoyant chamber attached to the horizontally opposite end of said body having an opening in the bottom surface thereof and open to said fluid atmospheres;
    a source of flotation fluid, said fluid having a density less than the density of said fluid atmosphere;
    means for controlling flow of said flotation fluid into said chambers; and
    means for releasing said flotation fluid from said chambers.

6. Apparatus according to claim 5 wherein said fluid amplifier means responsive to said velocity sensing means comprises:
    a pressurized power fluid source;
    a pressurized control fluid source in which said control fluid is at a lower operating pressure than said power fluid;
    at least one fluid amplifier having a power fluid input port, first and second control fluid input ports and first and second output ports;
    means for connecting said power fluid source to said power input port;
    means for connecting said control fluid source to said control fluid ports and to said velocity sensing means;
    means responsive to said velocity sensing means for controlling the flow of control fluid to said control ports;
    means for connecting one of said output ports to said means for controlling flow of said flotation fluid to said chamber; and
    means for connecting the other of said output ports to said means for releasing said flotation fluid from said chambers.

7. Apparatus according to claim 6 wherein said power fluid and said control fluid are the same as said fluid medium.

8. Apparatus according to claim 6 wherein said velocity sensor comprises:
    a lever having first and second ends;
    pivot means attached to said body and to said lever between the ends thereof for providing pivotal movement of said lever with respect to said body about a horizontal axis;
    a sensing surface attached to one end of said lever and having a planar surface which is normally horizontal and extends into said atmosphere;
    actuator means attached to the other end of said lever for controlling flow of said control fluid to the control ports of said amplifier in response to movement of said sensing surface in the fluid atmosphere.

9. Apparatus according to claim 6 wherein said fluid amplifier is a proportional amplifier.

10. Apparatus according to claim 5 wherein said means responsive to said attitude sensing means comprises:
    a source of pressurized power fluid;
    a source of pressurized control fluid, said control fluid pressure being less than the pressure of said power fluid;
    at least one fluid amplifier having a power input port, first and second control fluid input ports and first and second output ports;
    means connecting said power fluid source to said power fluid input ports;
    means for connecting said control fluid source to said control ports and to said attitude sensing means;
    means responsive to said attitude sensing means for controlling the flow of control fluid to said control ports;
    means for connecting one of said output ports to said means for releasing said flotation fluid from one of said chambers;

means for connecting the other of said output ports to said means for releasing said flotation fluid for releasing flotation fluid from the other of said chambers.

11. Apparatus according to claim 8 wherein said attitude sensor comprises:

a lever having first and second ends;

pivot means attached to said body and to said lever between the ends thereof for providing pivotal movement of said lever with respect to said body above a horizontal axis;

a sensing surface attached to one end of said lever for sensing movement of said body about said horizontal axis;

actuator means attached to the other end of said lever for controlling flow of said control fluid to the control ports of said amplifier in response to movement of said surface with respect to said body.

12. Apparatus according to claim 8 wherein said power fluid and said control fluid are the same as said fluid atmosphere.

13. Apparatus according to claim 8 wherein said fluid amplifier is a proportional amplifier.

References Cited

UNITED STATES PATENTS

| | | | |
|---|---|---|---|
| 2,451,002 | 10/1948 | Sturtevant | 114—54 |
| 3,306,247 | 2/1967 | Fanshawe | 114—125 |

ANDREW H. FARRELL, *Primary Examiner.*